(12) United States Patent
Shan et al.

(10) Patent No.: US 7,777,804 B2
(45) Date of Patent: Aug. 17, 2010

(54) HIGH DYNAMIC RANGE SENSOR WITH REDUCED LINE MEMORY FOR COLOR INTERPOLATION

(75) Inventors: Jizhang Shan, Cupertino, CA (US); Jiangtao Kuang, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 425 days.

(21) Appl. No.: 11/925,608

(22) Filed: Oct. 26, 2007

(65) Prior Publication Data

US 2009/0109306 A1  Apr. 30, 2009

(51) Int. Cl.
*H04N 5/235* (2006.01)
*H04N 9/083* (2006.01)
*H01L 27/00* (2006.01)

(52) U.S. Cl. ............... 348/362; 348/273; 250/208.1

(58) Field of Classification Search .......... 348/273, 348/362, 363; 250/208.1
See application file for complete search history.

(56) References Cited

U.S. PATENT DOCUMENTS

| | | | |
|---|---|---|---|
| 6,873,442 | B1 | 3/2005 | Gindele et al. |
| 2004/0080652 | A1 | 4/2004 | Nonaka et al. |
| 2004/0141075 | A1 | 7/2004 | Xu et al. |
| 2006/0188147 | A1 | 8/2006 | Rai et al. |
| 2006/0192867 | A1 | 8/2006 | Yosefin |
| 2006/0192873 | A1 | 8/2006 | Yaffe |
| 2007/0045681 | A1 | 3/2007 | Mauritzson et al. |
| 2007/0273785 | A1 | 11/2007 | Ogawa et al. |
| 2009/0002528 | A1* | 1/2009 | Manabe et al. ............. 348/248 |

FOREIGN PATENT DOCUMENTS

| | | |
|---|---|---|
| JP | 20021652260 A | 6/2002 |
| WO | WO 2006/049098 A1 | 5/2006 |

OTHER PUBLICATIONS

Shree K. Nayar, High Dynamic Range Imaging: Spatially Varying Pixel Exposures, 2000, IEEE.*

(Continued)

*Primary Examiner*—Jason Chan
*Assistant Examiner*—Joel Fosselman
(74) *Attorney, Agent, or Firm*—Lathrop & Gage LLP

(57) ABSTRACT

An image sensor has an array of pixels organized into a row and column format. Pixels are read out in a line-by-line sequence and buffered in a line image buffer. An extended dynamic range is supported by varying a column exposure time according to a periodic sequence. As a result, the pixel exposure times vary within each row. A high dynamic range is generated by combining pixel data of adjacent pixels within the same row that are of the same filter type but having different exposure times. Color interpolation is performed on the combined line data.

25 Claims, 7 Drawing Sheets

OTHER PUBLICATIONS

Mase, Mitsuhito et al., "A Wide Dynamic Range CMOS Image Sensor With Multiple Exposure-Time Signal Outputs and 12-Bit Column-Parallel Cyclic A/D Converters," IEEE Journal of Solid-State Circuits, vol. 40, No. 12, Dec. 2005 pp. 2787-2795.

Schrey, O. et al., "A 1K×1K High Dynamic Range CMOS Image Sensor With On-Chip Programmable Region of Interest Readout," *Fraunhofer Institute of Microelectronic Circuits and Systems*, Finkenstraβe 61, D-47057 Duisburg, Germany, 4 pages.

Yadid-Pecht, O. et al., "Wide Intrascene Dynamic Range CMOS APS Using Dual Sampling," IEEE Transactions on Electron Devices, vol. 44, No. 10, Oct. 1997, pp. 1721-1723.

Nayar, S.K, Mitsunaga, T., New York, NY, Computer Vision and Pattern Recognition, 2002, Proceeding IEEE Conference on Publication Date 2000, vol. 1, pp. 472-479.

International Search Report and Written Opinion issued in related PCT/US2008/080532, issued Jul. 15, 2009, 11 pages.

\* cited by examiner

Raw Pixel Output (Blue pixel at Colum 1, Row 1)

510

Light

Raw Pixel Output (Blue pixel at Colum 3, Row 1)

520

Light

Combined Pixel Data After Down Sampling

530

Light

| | | | |
|---|---|---|---|
| 701 → | $B_l$ | $G_l$ 710 | $B_l$ | $G_l$ 712 |
| 702 → | $G_l$ | $R_l$ | $G_l$ | $R_l$ |
| 703 → | $B_s$ | $G_s$ | $B_s$ 730 | $G_s$ |
| 704 → | $G_s$ | $R_s$ | $G_s$ | $R_s$ |
| 705 → | $B_l$ | $G_l$ 714 | $B_l$ | $G_l$ 716 |
| | $G_l$ | $R_l$ | $G_l$ | $R_l$ |
| | $B_s$ | $G_s$ | $B_s$ | $G_s$ |
| | $G_s$ | $R_s$ | $G_s$ | $R_s$ |

HIGH DYNAMIC RANGE SENSOR WITH REDUCED LINE MEMORY FOR COLOR INTERPOLATION

FIELD OF THE INVENTION

The present invention is generally related to the field of high dynamic range CMOS image sensor devices. More particularly the present invention is directed to techniques to perform color interpolation in a high dynamic range sensor.

BACKGROUND OF THE INVENTION

High dynamic range image sensors are desirable in a variety of application. As is well known in the field of image sensors, the dynamic range is the ratio of the largest detectable signal to the smallest (which for a CMOS image sensor is often defined by the ratio of the largest non-saturating signal to the standard deviation of the noise under dark conditions). That is, an image sensor's total electrical dynamic range is limited by: 1) the charge saturation level at the upper end; and 2) the noise level at the lower end produced in the analog circuits and A/D conversion. The light dynamic range of a scene is also defined as the ratio between the brightest and darkest objects that can be detected. A high dynamic range (HDR) image sensor may, for example, have a dynamic range greater than 70 dB, such as a dynamic range of 80-100 dB and will typically need more than 12-bits per channel when encoded in a linear space. When the electrical dynamic range of an image sensor is too small to record all light intensity variations in a scene it will result in either the highlight portions being saturated or the shadowed parts being too dark to be recognized. Therefore, there is a desire to increase the dynamic range of an image sensor to accurately reproduce the natural appearance of HDR scenes.

FIG. 1 illustrates a conventional complementary metal oxide semiconductor (CMOS) image sensor. The pixel array 100 has pixels 102 arranged into a set of columns and rows having a column parallel read out architecture in which pixels in a row are read out simultaneously and processed in parallel. That is, Row 0 is read out, then Row 1, then Row 2, and so on until Row M is read out. Sample and hold (S&H) elements support the line-by-line row read out of rows. The rows in a frame have the same exposure time for full resolution modes and down-sampling modes.

The line data that is readout is buffered by a line image buffer. The silicon area (and hence cost) of a line image buffer depends upon the number of lines it must buffer. For many conventional image sensor designs a 3-line image buffer 120 is sufficient to support color interpolation in an image processor 130.

In single sensor color image sensor systems, each pixel on the sensor has a specific color filter determined by the pattern of an array of color filters known as a "color filter array" (CFA). A color image requires at least three color samples in each pixel position. However, a CFA allows only one color to be measured at each pixel. The camera must estimate the missing color values in each pixel. The process is known as color interpolation or demoisaicing. The simplest color interpolation schemes are based on a bilinear interpolation in two dimensions.

FIG. 2 illustrates some of the concepts behind 3-line image buffer bilinear interpolation. Each pixel is assigned a numeric value (e.g., 1, 2, 3, 4, 5) indicative of its location. In this example, a pixel, such as pixel 3, has a color filter such that the pixel samples a color which is not green, such as red or blue. Interpolation is performed for pixel 3 to determine the green (G) channel for pixel 3 based on the green color samples of neighboring green pixels G1, G2, G4, and G5. However, for pixel 3, the green value must be interpolated. G3 is thus an estimated value of the green color in pixel 3. Using bilinear interpolation the estimated green value in pixel 3 is estimated as: $G_3=(G_1+G_5+G_2+G_4)/4$. Note that to perform conventional color interpolation on pixel 3 requires data from pixels in the lines above and below the pixel. As can be understood from the example of FIG. 2, conventionally a 3-line image buffer is sufficient to support color interpolation.

A variety of high dynamic range image sensors are known in the prior art. However, many known image sensors have various disadvantages including increased cost for the image sensor and the associated line image buffer memory required to support a high dynamic range. In particular, many previous high dynamic range image sensor approaches have required the use of significantly more expensive hardware and/or buffer memory than for a conventional image sensor.

Therefore, in light of the above described problems the apparatus, system, and method of the present invention was developed.

SUMMARY OF THE INVENTION

An image sensor has an array of pixels organized into a row and column format that supports a line-by-line read out of the rows. The individual lines are buffered in a line image buffer of an image processor. Each pixel is also assigned a color filter array (CFA) filter according to a CFA pattern. An extended dynamic range is supported by selecting a sequence of column exposure times. An individual column of pixels has the same exposure time for all of the pixels within the column. However, the column exposure times are varied along a horizontal direction according to a periodic sequence. This results in an individual row having a corresponding periodic sequence of pixel exposure times across the row. The sequence is selected to permit pixel data from sets of adjacent pixels of the same filter type but different exposure times to be combined within an individual line to generate combined line data having a reduced line width but an extended dynamic range. Color interpolation is then performed on the combined line data. One aspect of performing color interpolation on the combined line data is that it permits a conventional 3-line image buffer to be used to support both a conventional image mode and a high dynamic range mode of operation.

BRIEF DESCRIPTION OF THE FIGURES

The invention is more fully appreciated in connection with the following detailed description taken in conjunction with the accompanying drawings, in which:

FIGS. 6-7 illustrate a previous generation design requiring greater line image buffer memory to perform demosaicing.

Like reference numerals refer to corresponding parts throughout the several views of the drawings.

DETAILED DESCRIPTION OF THE INVENTION

Figure 1:
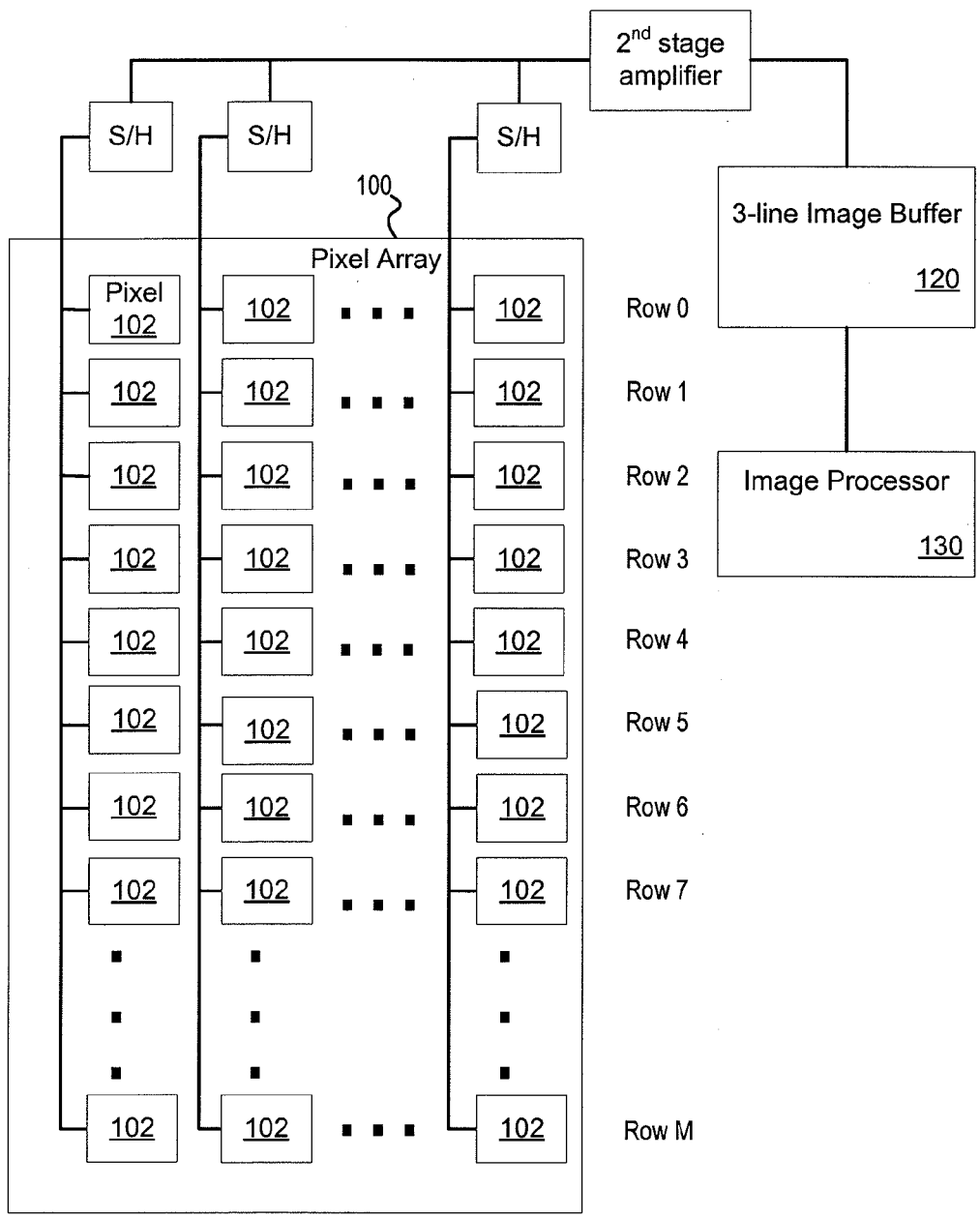
FIG. 1 illustrates a conventional CMOS image sensor and associated line image buffer memory.
Figure 2:
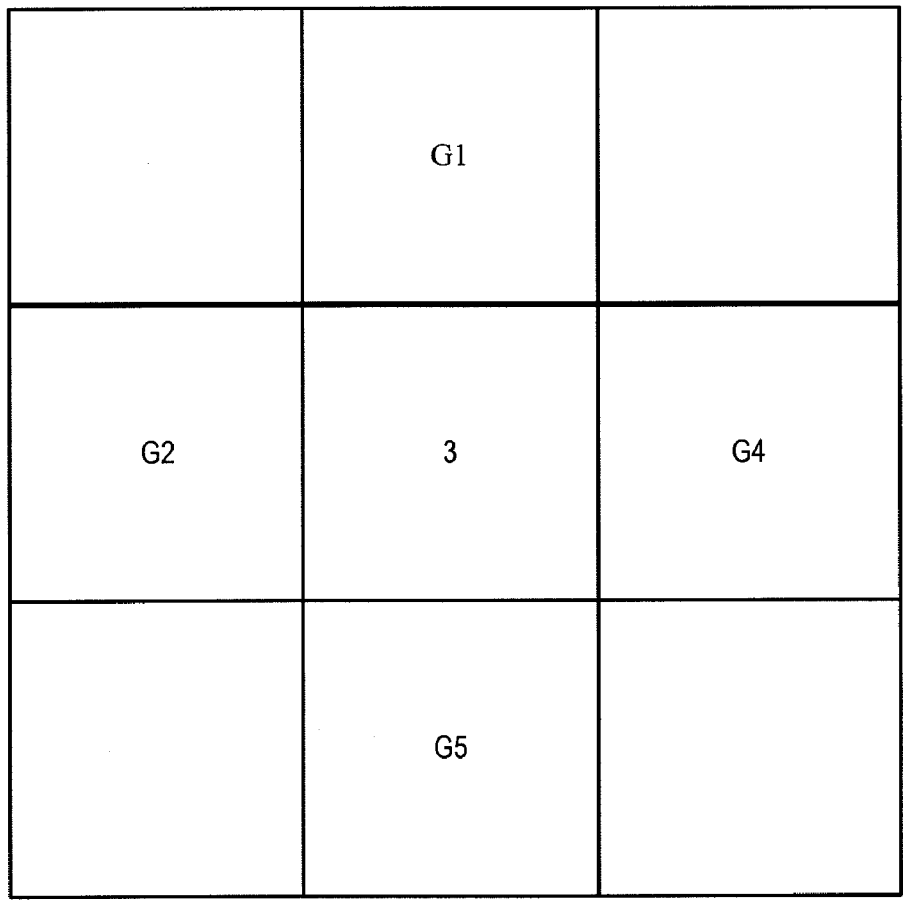
FIG. 2 illustrates a conventional bilinear color interpolation technique.
Figure 3:
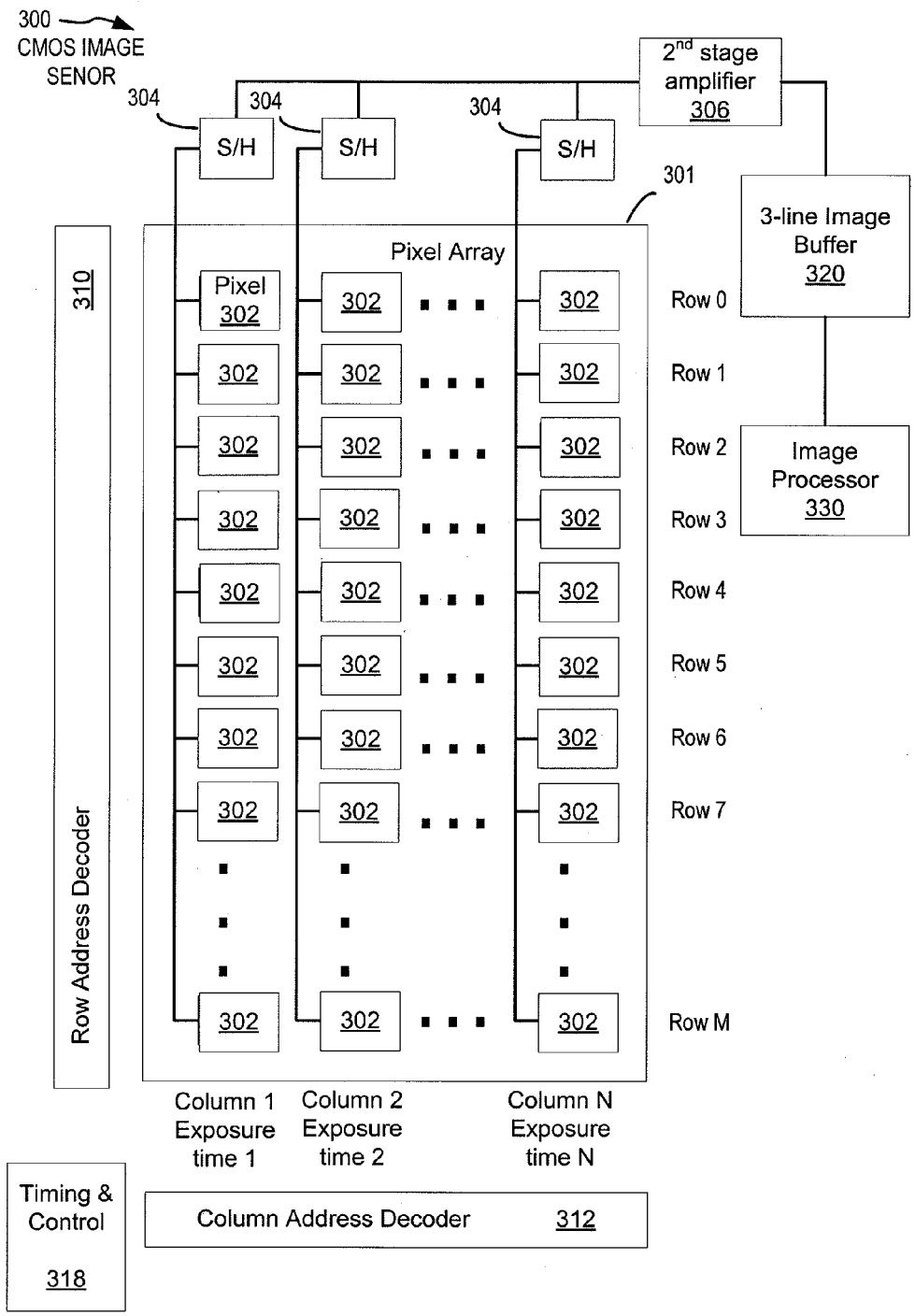
FIG. 3 illustrates a CMOS image sensor in accordance with one embodiment of the present invention.

FIG. 3 illustrates an exemplary image sensing system in accordance with one embodiment of the present invention. A CMOS image sensor 300 includes a focal plane array 301 of pixels 302 ("a pixel array"). Each pixel 302 is a cell that includes a photo sensor (not shown) for producing a photo-generated charge in a doped region of the substrate. A conventional readout circuit (not shown) is provided for each pixel cell and includes at least a source follower transistor and a row select transistor for coupling the source follower transistor to a column output line. Sample and hold (S&H) elements 304 and amplifier 306 support the line-by-line read out of the rows. The pixel data is read out in a line-by-line basis and buffered in the line image buffer 320. In a preferred embodiment, the line image buffer is a 3-line image buffer 320 which has a buffer capacity sufficient to store 3 lines of image data for an image processor 330 operating in a full resolution mode. As an illustrative example, for a 640×480 pixel array each line of the line image buffer would be sized to store pixel data for an entire line of 640 pixels.

A row address decoder 310 and a column address decoder 312 are provided to support reading out the pixels. A timing & control block 318 controls the decoders 310 and 312. Timing & control block 318 and decoders 310 and 312 support a line-by-line row read out of pixel data. Additionally, timing & control block 318 sets the gain and exposure time of the pixels. In one embodiment timing & control block 318 supports a high dynamic range mode of operation in which different gains and exposure times can be set for each column of pixels. For example, as illustrated in FIG. 3, in one embodiment the exposure time is set on a column basis. That is, all of the pixels in a particular column have the same exposure time but with the timing & control block 318 supporting a mode of operation in which there is a sequence of column exposure times, i.e. column 1 has a first exposure time for all of the pixels in column 1, column 2 has a second exposure time for all of the pixels in column 2, and so on. As described below in more detail, the sequence of column exposure times is preferably a periodic sequence of different column exposure times, such as a periodic sequence of short and long column exposure times.

A result of selecting a sequence of column exposure times is that an individual row of pixels will have a corresponding sequence of pixel exposure times across the individual row. That is, an individual row, such as Row 1, will have a first pixel from column 1, a second pixel from column 2, and so on with the row concluding with a pixel from column N. Thus, selecting a sequence of column exposure times results in a corresponding variation in the individual exposure times of pixels across individual rows.

Figure 4:
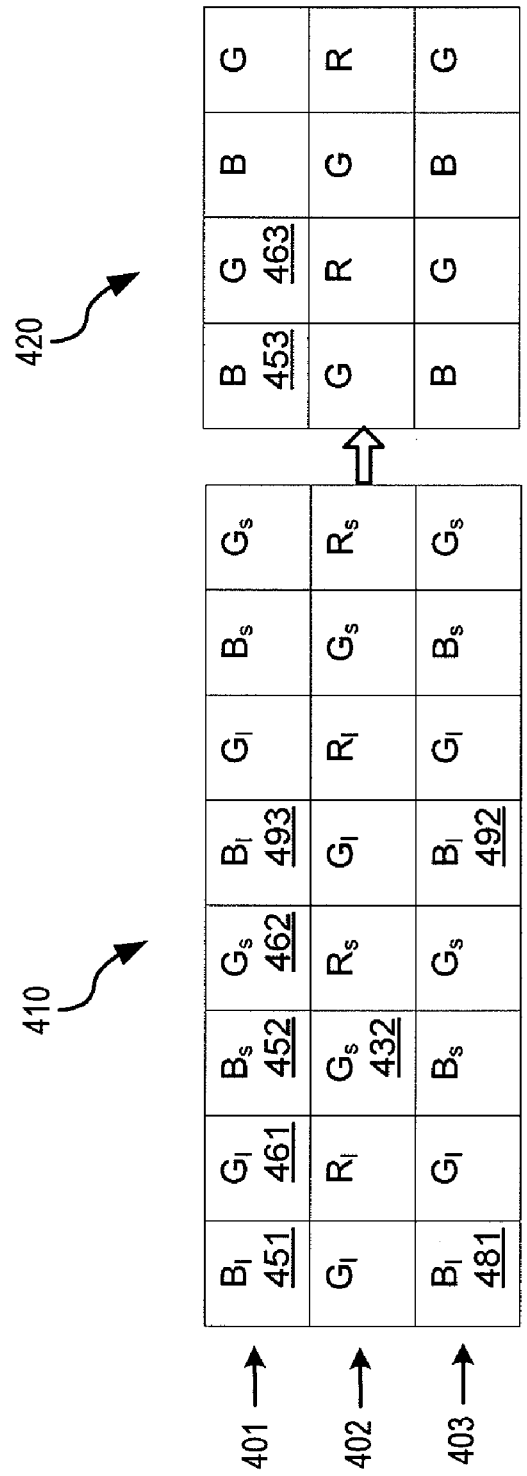
FIG. 4 illustrates an exemplary demosaicing process in accordance with one embodiment of the present invention.

FIG. 4 illustrates an exemplary mode of operation to achieve a high dynamic range compatible with a 3-line color interpolation scheme. The left portion 410 of FIG. 4 illustrates a set of lines 401, 402, and 403 corresponding to raw line data output from the pixel array 301. The right portion 420 illustrates pixels after horizontal down-sampling within the line image buffer 320. In the example of FIG. 4, Red (R), Green (G), and Blue (B) pixels are illustrated. As illustrated by the subscripts, in an exemplary embodiment the column exposure times are selected such that there are two columns with a long (l) column exposure time followed by two columns with a short (s) column exposure time with the sequence repeating every four columns. Within an individual line in left portion 410 an individual pixel color has a periodic sequence of pixel exposure times with regards to adjacent pixels of the same color (i.e., when looking only at the blue pixels in line 401, the long exposure time blue pixel 451 is followed by a short exposure time blue pixel 452 as the next blue pixel; similarly when looking only at the green pixels in line 401, the long exposure time green pixel 461 is followed by short exposure time green pixel 462 as the next green pixel).

The buffered line data is horizontally down-sampled by the image processor 330. Thus as illustrated by right portion 420, sets of adjacent pixels of the same color but different exposure times, such as blue pixels 451 and 452, are combined to generate a pixel 453. Similarly, green pixels 461 and 462 are combined to generate green pixel 463. Thus, one line of raw pixel data comprising data from four pixels $B_l$, $G_l$, $B_s$, $G_s$, is combined within one line of the image buffer to result in two pixels B, G, wherein the B pixel is a combination of adjacent blue pixels $B_l$, and $B_s$ and the G pixel is a combination of adjacent green pixels $G_l$ and $G_s$. Thus, after down-sampling the combined line data requires only half of the total storage capacity in an individual line, i.e. the effective storage requirement of the combined line data corresponds to half-line buffers instead of full-line buffers.

Color interpolation may then be performed on the down-sampled line data to determine the color values for each pixel. The color interpolation utilizes a demosaicing algorithm (digital image processing) to interpolate the complete image (i.e., a full set of color data at each pixel location) from the combined line data. Note that many CFA patterns (such as the Bayer pattern) have a periodicity of two columns. Selecting the periodicity of the column exposure times to be a multiple of that of the CFA pattern permits a type of horizontal down-sampling in which within individual lines adjacent pixels of the same CFA filter type but different column exposure times can be combined to increase the dynamic range. Thus while FIG. 4 illustrates a Bayer Red-Green-Blue (RGB) CFA pattern, it would be understood that the same principles apply to other common CFA patterns, such as a Red-Green-Blue-Emerald (RGBE) pattern, a Red-Green-Blue-Clear (RGBC) pattern, and a Cyan-Yellow-Green-Magenta (CYGM) pattern.

Figure 5:
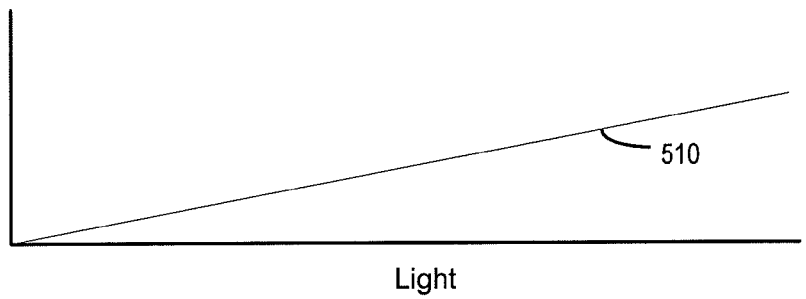
FIG. 5 illustrates improvements in dynamic range achieved by utilizing different column exposure times.
Figure 5:
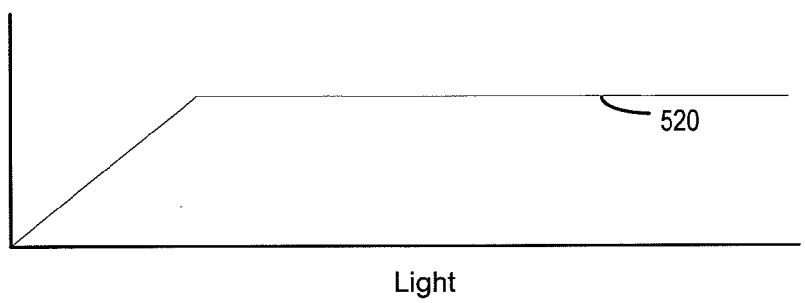
Figure 5:
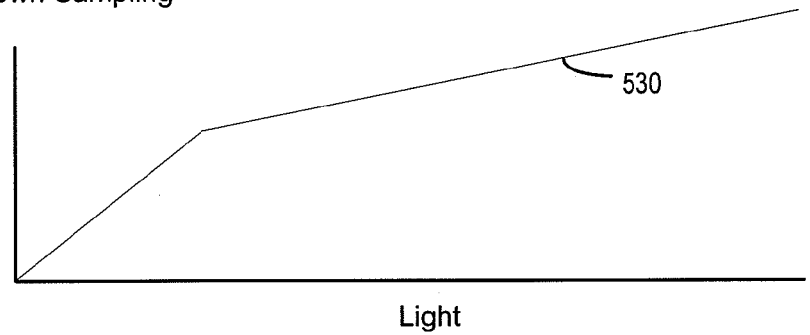

FIG. 5 illustrates how raw pixel data is combined to increase dynamic range. In this example, plot 510 is raw pixel data for a first pixel with a short column exposure time, such as a blue pixel at a location of row 1, column 1. Since the column exposure time is short, the pixel saturates at high light levels. Another pixel, such as a blue pixel at a location of row 1, column 3, has a long column exposure time. As a result, this pixel is more sensitive but saturates at comparatively low light levels, as illustrated in plot 520. By combining data for the two pixels (which are in the same line) the combined response results in a high dynamic range as illustrated in plot 530.

Note that the vertical resolution is preferably maintained throughout color interpolation to avoid aliasing artifacts. That is, any initial down-sampling and reduction in resolution is only in the horizontal (x) dimension. In the horizontal direction, when the pixel data is read out by row, the long exposure columns are first combined with the short exposure columns to extend the dynamic range of the data. Note that if additional downsampling in the vertical (y) direction is required, it can be performed after color interpolation is performed.

Referring back again to the example in which the raw pixel data $B_l$, and $B_s$ is combined there are several options for the manner in which the pixel data is combined. One option is to average the pixel data. However, in a preferred embodiment the pixels are combined according to a weighting function with a ratio selected to provide the best combination of resolution and signal-to-noise ratio. In particular, the combination equation is preferably adjustable based on the exposure ratio of the long exposure time columns to the short exposure time columns. A combination equation is shown in Equation 1 to determine the combined pixel data (Comb.) for two pixels in the same row having different exposure times where w is a simple weighting factor, L_exp is data for the long column exposure time pixel, S_exp is data for the short column exposure time pixel, ratio is the exposure ratio between long and short exposure times, and * is multiplication:

$$\text{Comb.} = w * L\_\exp + (1-w)(S\_\exp * \text{ratio}) \qquad \text{Eq. 1}$$

Table 1 shows exemplary weighting factors for different gain and ratio combinations. The exemplary weighting function is selected to provide the best combination of resolution and signal-to-noise ratio using, for example, empirical investigations.

TABLE 1 w values for different gain and ratio combinations

|  | 1 ≤ gain < 2 | 2 ≤ gain < 4 | gain ≥ 8 |
| --- | --- | --- | --- |
| ratio = 1 | w = 0.5 | w = 0.5 | w = 0.5 |
| ratio = 8 | w = 1 | w = 0.8 | w = 0.5 |

One aspect of the present invention is that it permits a high dynamic range to be achieved in an architecture that is compatible with a low cost implementation. For example, in one implementation the image sensor also supports a conventional mode of operation in which each column has the same column exposure time with full horizontal resolution. In this embodiment, the high dynamic range mode can be implemented as an option to the conventional mode of operation.

Another aspect of the present invention is that demosaicing can be supported using a conventional line image buffer size, such as a 3-line image buffer. As illustrated in FIG. 4, after a line of raw pixel data is received in the line image buffer (such as line 401), sets of adjacent pixels of the same filter type but different column exposure times are combined within the line. This reduces the horizontal resolution but increases the dynamic range. Demosaicing (to perform color interpolation) is performed on the combined line data. In particular, a conventional bilinear color interpolation scheme can be used, requiring only 3 lines of buffering (e.g., to buffer lines 401, 402, and 403). This permits a conventional sized image buffer (e.g., a 3 line image buffer) to support demosaicing. As a result no more extra image line buffers are needed for demosaicing than for conventional (full resolution) image sensors. Thus, the present invention permits an optional high dynamic range mode of operation to be implemented without requiring any increase in line image buffer memory.

Another way to understand the demosaicing process of the present invention is that the process of demosaicing an individual pixel location operates on data derived from groups of five columns of the raw image buffer data. For example, consider the green pixel location 432 in the second line 402 of left portion 410. If bilinear interpolation was performed on the raw line data, then to interpolate a blue color value at pixel location 432 would require B, pixel data from pixels 451, 462, 492, and 493. Thus, if color interpolation was performed on the raw line data, data from five columns would be required. However, line buffers have storage units corresponding to the maximum line width of the image sensor in a full resolution mode. The demosaicing process of the present invention leverages that inherent line storage capacity by first combining pixel data (within individual lines) prior to demosaicing. As a result the dynamic range is increased and demosaicing can be performed on the combined data using a three-line color interpolation technique, such as conventional bilinear interpolation.

Figure 6:
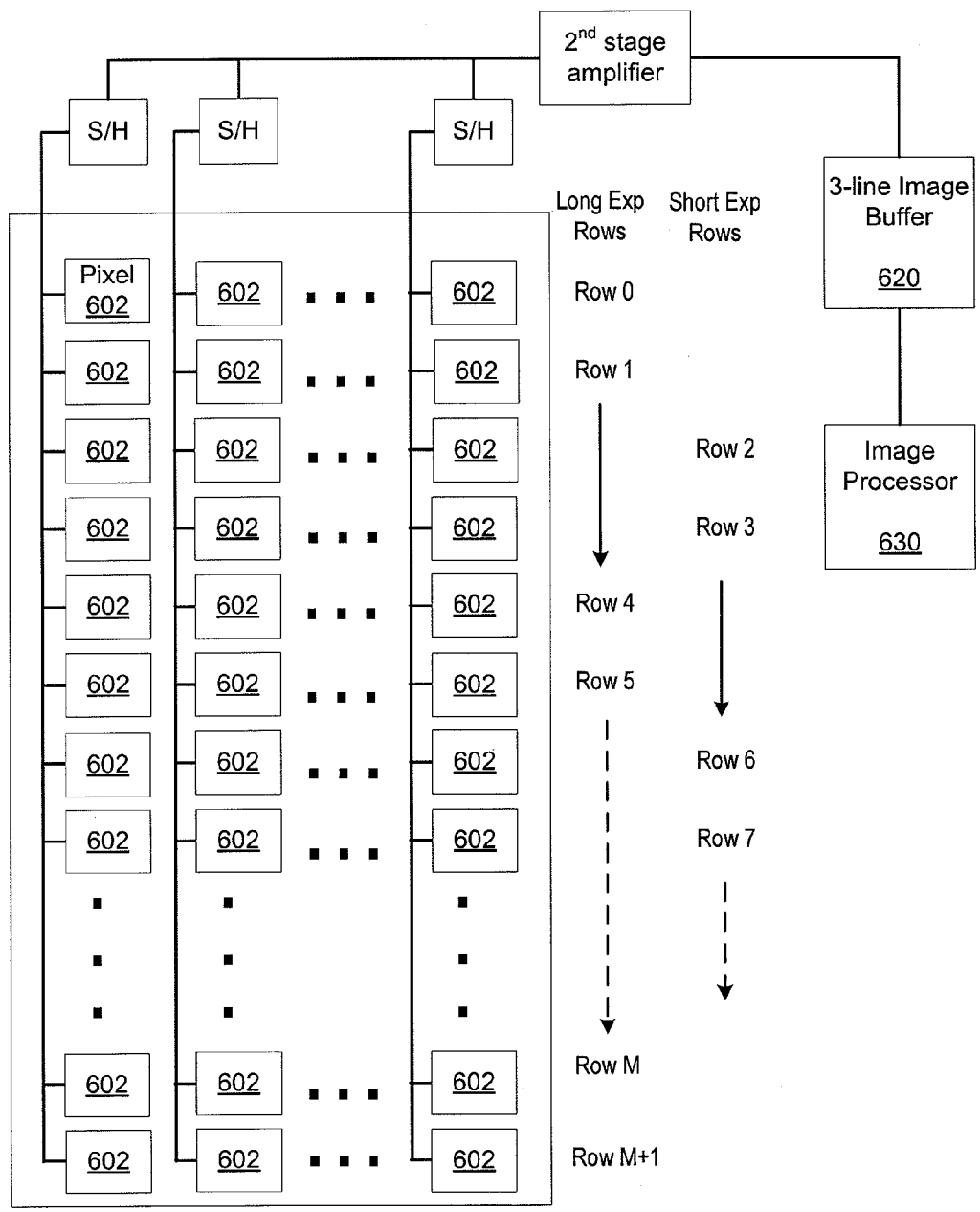

Some of the benefits of the present invention can be understood with reference to FIGS. 6 and 7, which illustrates an earlier generation CMOS image sensor developed by OmniVision Technologies, Inc. which is described in more detail in U.S. patent application Ser. No. 11/849,129, filed on Aug. 30, 2007, "Image Sensor With High Dynamic Range In Down-Sampling Mode," the contents of which are hereby incorporated by reference. Referring to FIG. 6, the invention described U.S. patent application Ser. No. 11/849,129 has a mode of operation in which an individual row of pixels has the same exposure time ("row exposure time") but there is a sequence of row exposure times. As illustrated in FIG. 6, the previous generation image sensor has an array of pixels 602 and was designed to support line-by-line readout of pixel data to a line image buffer 620 for processing by an image processor 630. However, in a vertical down-sampling mode each row has a constant row exposure time for all of the pixels in the row. However, there is a sequence of row exposure times. For example, for a Bayer pattern two rows have a long exposure (exp) time, two rows have a short exposure time, and so on in an alternating sequence as illustrated in FIG. 6. FIG. 7 illustrates a sequence of line data as output from the image sensor. In order to perform demosaicing a minimum of 5 lines (701, 702, 703, 705, and 705) of image buffering are required to achieve the same interpolation performance as conventional image sensors. For example, consider the blue pixel location 730 which is within the third line 703. In order to perform bilinear color interpolation for the green color at the same pixel location 730, the green long exposure time pixels 710, 712, 714, and 716 are required. Thus, to perform color interpolation for a pixel location within the third line 703, lines 701 and 705 are also required. Thus, the prior generation high dynamic range image sensor required a 5-line image buffer to support demosaicing with the same interpolation performance as conventional image sensors having a 3-line image buffer. However, the requirement for additional line memory, in turn, increased the size and cost of the CMOS sensor chip.

In contrast to the previous generation image sensor of FIGS. 6-7, the image sensor of the present invention can be implemented with a 3-line image buffer, which saves 66% of the line image buffers of the previous generation design of FIGS. 6-7. Additionally, compared with the previous generation design, the present invention has empirically demonstrated better resolution in vertical direction and less aliasing. In the horizontal direction, it has slightly less resolution than the previous generation design. However, it is possible to increase the resolution and reduce aliasing by using more units in a line image buffer.

While the present invention has been described in detail in regards to an example in which there are two different column exposure times, it will be understood that further extensions and modifications are possible. For example, if a periodic sequence of three different column exposure times were selected, a further increase in the dynamic range could be achieved. In this example, in each line data from sets of pixels of three different exposure times would be combined to increase the dynamic range. After combined line data is generated the effective line date width would be reduced to one-third. As another extension, it will be understood that other known techniques to modify pixel exposure times about default values over the pixel array could be used in conjunction with the present invention. Additionally, it will be understand that the present invention may be applied to a subset of the total area of a pixel array.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method of achieving a high dynamic range in an image sensor having photo-sensitive pixels arranged in a row and column format with each pixel further assigned a color filter array filter (CFA) filter according to a CFA pattern, comprising:
   for each individual column of pixels, selecting a common exposure time for all of the pixels within the individual column as a column exposure time;
   selecting the column exposure times to vary along a horizontal dimension according to a periodic sequence selected such that within each individual row of pixels there is a corresponding periodic sequence of pixel exposure times for pixels of each individual color filter type;
   reading out rows in a line-by-line sequence;
   buffering a selected number of lines in a line memory;
   for each line, combining data from sets of adjacent pixels of the same color filter type having at least two different exposure times to generate combined line data having a reduced horizontal resolution and an extended dynamic range; and
   performing de-mosaicing on the combined line data.

2. The method of claim 1, wherein the line memory is sized to support 3-line de-mosaicing.

3. The method of claim 1, wherein the color filter array pattern repeats the same color filter type after every two pixels within an individual row and the periodic sequence is selected such that there is a periodic sequence of long exposure time pixels and short exposure time pixels for each color filter type.

4. The method of claim 1, wherein said combining data is performed using a weighted ratio of the contribution of pixels in each set, the weighting selected based on a combination of resolution and signal to noise ratio criteria.

5. The method of claim 1, wherein the line memory is sized to support 3-line demosaicing and a bilinear interpolation is performed on the combined line data.

6. The method of claim 1, further comprising supporting a full resolution mode in which the pixels have the same exposure time and line data is not combined.

7. A method of achieving a high dynamic range in an image sensor having photo-sensitive pixels arranged in a row and column format supporting line-by-line read out of rows with each pixel further being assigned a color filter array (CFA) filter according to a CFA pattern, the method comprising:
   for each individual column of pixels, selecting a common exposure time for all of the pixels within the individual column as a column exposure time;
   selecting the column exposure times to vary along a horizontal dimension according to a sequence, the sequence selected such that within each individual row the pixels of a particular filter type have a periodic sequence of pixel exposure times;
   reading out rows in a line-by-line sequence;
   buffering lines in a line memory sized to support 3-line de-mosaicing;
   for each line, combining data from sets of adjacent pixels having the same filter type but at least two different exposure times to generate combined line data having no more than half the effective line width and an extended dynamic range; and
   performing color interpolation on the combined line data to determine color values at each pixel location.

8. The method of claim 7, wherein the CFA pattern repeats the same color filter type every two pixels within an individual row and the periodic sequence is selected such that there is a periodic sequence of long exposure time pixels and short exposure time pixels for each color filter type.

9. The method of claim 7, wherein said combining data is performed using a weighted ratio of the contribution of pixels in each set, the weighting selected based on a combination of resolution and signal to noise ratio criteria.

10. The method of claim 7, wherein the color interpolation comprises bilinear interpolation is performed on the combined line data.

11. The method of claim 7 further comprising supporting a full resolution mode in which the pixels have the same exposure time and line data is not combined.

12. A method of supporting an extended dynamic range using a 3-line image buffer in an image sensor having photo-sensitive pixels arranged in a row and column format supporting line-by-line read out of rows with each pixel further being assigned a color filter array (CFA) filter according to a CFA pattern, the method comprising:
   in a full resolution mode of operation, setting a common default exposure time for each pixel and performing color interpolation using the 3-line image buffer;
   in a high dynamic range mode of operation:
       selecting a common exposure time for all of the pixels within an individual column as a column exposure time and varying the column exposure times to vary along a horizontal dimension according to a sequence, the sequence selected such that within each individual row the pixels of a particular filter type have a periodic sequence of pixel exposure times;
       reading out rows in a line-by-line sequence;
       buffering lines in the 3-line image buffer;
       for each line, combining data from sets of adjacent pixels having the same filter type but two different exposure times to generate combined line data having half the effective line width and an extended dynamic range; and
       performing color interpolation on the combined line data to determine color values at each pixel location.

13. The method of claim 12, wherein the color filter array pattern repeats the same color filter type every two pixels within an individual row and in the high dynamic range mode and the periodic sequence is selected such that there is a periodic sequence of long exposure time pixels and short exposure time pixels for each color filter type.

14. The method of claim 12, wherein in the high dynamic range mode said combining data is performed using a weighted ratio of the contribution of pixels in each set, the weighting selected based on a combination of resolution and signal to noise ratio criteria.

15. An image sensing system, comprising:
an array of photo-sensitive pixels organized into rows and columns with each pixel assigned to a color filter array filter; and
a control block and an address decoder configured to support a high dynamic range mode of operation by selecting a common exposure time for all of the pixels within an individual column as a column exposure time and varying the column exposure times along a horizontal dimension according to a periodic sequence, the sequence selected such within each individual row of pixels each set of pixels of a particular filter type has a corresponding periodic sequence of pixel exposure times with individual rows being read out in a line-by-line sequence.

16. The image sensing system of claim 15, further comprising a 3-line image buffer to receive line data from the pixel array and an image processor to process buffered line data.

17. The image sensing system of claim 16, wherein for each line of buffered line data the image processor combines raw pixel data from sets of adjacent pixels having the same filter type but at least two different exposure times to generate combined line data having half the effective line width and an extended dynamic range, the image processor performing color interpolation on the combined line data.

18. The image sensing system of claim 15, wherein individual pixels in the array are each assigned to particular colors by a color array filter pattern having a specified color sequence for each row that repeats after a selected number of columns.

19. The image sensing system of claim 17, wherein the color filter array pattern repeats the same color filter type every two pixels within an individual row and the periodic sequence is selected such that there is a periodic sequence of long exposure time pixels and short exposure time pixels for each color filter type.

20. The image sensing system of claim 17, wherein combined line data is generated using a weighted ratio of the contribution of pixels in each set, the weighting selected based on a combination of resolution and signal to noise ratio criteria.

21. The image sensing system of claim 15, wherein the image sensing system supports a full resolution mode in which the pixels have the same exposure time and line data is not combined.

22. An image sensing system, comprising:
a pixel array of photo-sensitive pixels organized into rows and columns with each pixel assigned to a color filter array filter;
a control block and address decoders to control pixel exposure time for each pixel with individual rows being read out in a line-by-line sequence;
a 3-line image buffer to buffer line data received from the pixel array for processing by an image processor;
the image sensing system having a first mode of operation in which each pixel has the same default exposure time and color interpolation is performed on the line data in the 3-line image buffer;
the image sensing system further having a high dynamic range mode of operation in which the control block selects a common exposure time for all of the pixels within an individual column as a column exposure time and varies the column exposure times along a horizontal dimension according to a sequence, the sequence selected such within each individual row of pixels each set of pixels of a particular filter type has a periodic sequence of pixel exposure times, with for each line of buffered pixel data in the 3-line memory the image processor combining raw pixel data from sets of adjacent pixels having the same filter type but at least two different exposure times to generate combined line data having half the effective line width and an extended dynamic range, the image processor performing color interpolation on the combined line data to determine color values at each pixel location.

23. The image sensing system of claim 22, wherein the color filter array pattern repeats the same color filter type every two pixels within an individual row and the periodic sequence is selected such that there is a periodic sequence of long exposure time pixels and short exposure time pixels for each color filter type.

24. The image sensing system of claim 22, wherein combined line data is generated using a weighted ratio of the contribution of pixels in each set, the weighting selected based on a combination of resolution and signal to noise ratio criteria.

25. The image sensing system of claim 22, wherein the image sensing system supports a full resolution mode in which the pixels have the same exposure time and line data is not combined.

* * * * *